United States Patent
Schmidt

(12)
(10) Patent No.: US 6,430,338 B1
(45) Date of Patent: Aug. 6, 2002

(54) MEASURING DEVICE WITH AN OPTICAL INTERFACE WITH LOW POLARIZATION DEPENDENT LOSS (PDL)

(75) Inventor: Siegmar Schmidt, Wildberg (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/568,972

(22) Filed: May 11, 2000

(30) Foreign Application Priority Data

May 12, 1999 (EP) ............................................. 99109469

(51) Int. Cl.⁷ ................................................. G02B 6/26
(52) U.S. Cl. ........................................... 385/31; 385/33
(58) Field of Search ............................... 385/11, 15, 24, 385/31, 33, 34, 35, 38, 39, 73, 74

(56) References Cited

U.S. PATENT DOCUMENTS

| 4,492,436 A | | 1/1985 | Bergmann |
| 5,574,809 A | * | 11/1996 | Watanabe et al. ............. 385/31 |
| 5,652,814 A | * | 7/1997 | Pan et al. ..................... 385/24 |
| 5,657,148 A | * | 8/1997 | Feuer et al. ................. 359/263 |
| 6,023,542 A | * | 2/2000 | Pan et al. ..................... 385/24 |
| 6,167,174 A | * | 12/2000 | Zhang et al. ................. 385/33 |
| 6,266,462 B1 | * | 7/2001 | Kim et al. .................... 385/28 |

FOREIGN PATENT DOCUMENTS

| EP | 0 488 211 A | 6/1992 |
| EP | 0 554 849 A | 8/1993 |
| JP | 07084124 | 3/1995 |

* cited by examiner

*Primary Examiner*—Frank G. Font
*Assistant Examiner*—Michael P Mooney

(57) ABSTRACT

An optical measuring device includes an optical detector for measuring an incident optical signal coupled to the detector by an optical fiber. The optical fiber and/or the optical detector comprise an interface between optical media with different refractive indices, e.g., a boundary surface, face or facet. The interface is angled with respect to the incident optical signal to reduce reflection in the direction of the incident optical signal. Because light transmitted with a polarization perpendicular to the plane of incidence of the optical signal has an intensity substantially equal to the intensity of light transmitted with a polarization parallel to the plane of incidence of the optical signal, the incident optical signal transmitted through the interface is substantially independent of the polarization direction of the incident optical signal.

12 Claims, 4 Drawing Sheets

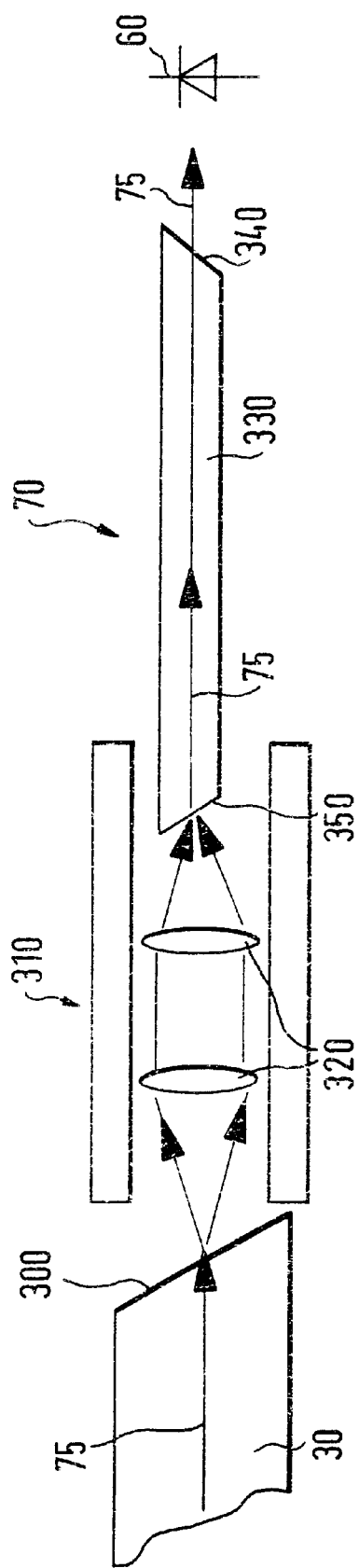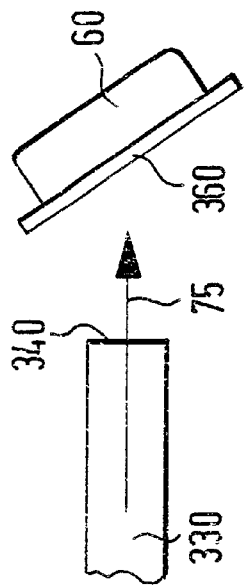
FIG. 3A
FIG. 3B

MEASURING DEVICE WITH AN OPTICAL INTERFACE WITH LOW POLARIZATION DEPENDENT LOSS (PDL)

BACKGROUND OF THE INVENTION

The present invention relates to boundary surfaces between optical media with different refractive indices in measuring devices.

In some optical applications, in particular in fiber optical paths, it is important to avoid or at least reduce unwanted return reflections, i.e. reflections in the direction of an incident optical signal, since such return reflections can disturb e.g. the source (for example a laser diode) of the optical signal. This can lead, amongst others, to signal deviations of the optical signal source.

Reflections, in general, are caused by boundary surfaces (also referred to as contact surfaces) in the optical path due to differences in refractive indices. E.g. in fiber optical paths, reflections are caused at all boundary surfaces and in particular at fiber terminations, such as fiber connections. High values of reflections result in particular from transitions between the optical path media and air for transitions perpendicular to the propagation direction of the optical path. Assuming an optical glass fiber with a refractive index of n=15 would result in a reflectivity R=4% for such a perpendicular glass air transition. Using the definition of return loss RL in logarithmic dB values:

$$RL = -10 \lg(R)$$

leads to a return loss of RL=14 dB for the exemplary perpendicular glass-air transition.

In order to diminish the influence of unwanted reflections, boundary surfaces such as optical path terminations are generally provided to be angular, angled or tilted (referred to in the following as 'angular'). In optical fibers, such fiber terminations are usually grinded or cut in an angular manner. Typical angles of a standard single mode fiber with approximately 0.008 to 0.010 mm mode field diameter (1300 nm, 1550 nm) are about 8°. The return loss RL in such a case will be greater than 60 dB. U.S. Pat. No. 5,574,809 discloses an optical fiber with inclined end faces with anti-reflection films formed thereon.

Disadvantageous in providing angular terminations of the optical path, however, is the polarization dependent transmission through that termination which is caused by that angular boundary surface. Since optical signals transmitted on optical paths, such as fibers, are normally polarized, transmission and accordingly loss at such angular boundary surfaces (e.g. fiber-fiber or fiber-air) is dependent on the state of polarization of the optical signal. The state of polarization of the optical signal, however, will be modified by any deflection and/or change in temperature and fiber bending within the optical path, so that the state of polarization at the angular boundary surfaces is undefined and varies statistically. The optical power of the optical signal will thus be modified in a statistical and accordingly undefined manner at each boundary surface with polarization dependent transmission characteristics. This effect even increases if there are a plurality of polarization dependent boundary surfaces located within the optical path.

The polarization dependent loss (PDL) is generally defined as:

$$PDL = -10 lg\left(\frac{\Delta P}{P_{average}}\right) \cong -10\, lg\left(\frac{P_{max} - P_{min}}{\frac{1}{2} \cdot (P_{max} + P_{min})}\right)$$

whereby $\Delta P$ represents the difference in power between a maximum power value $P_{max}$ and a minimum power value $P_{min}$ of a back reflected signal under the influence of polarization which might occur for an incident signal. $P_{average}$ represents the average power that can be approximated as $\frac{1}{2}(P_{max} - P_{min})$.

U.S. Pat. No. 4,492,436 and Mordechai Gilo, Design of a nonpolarizing beamsplitter inside a glass cube, Applied Optics, Sep. 1, 1992, Vol. 31, No. 25, pages 5345–5349 disclose polarization independent beam splitters. In Gilo, the transmittance values are designed and optimized to give either Tp=Ts or Tp+Ts=constant, in the vicinity of $\lambda_0$. A polarization independent, linear tuned interference filter with constant transmission characteristics is disclosed under this title by N. Mekada et al., IEEE Photonics Technology letters, June 1997, vol. 9, No. 6.

If measuring devices are coupled to the optical path for determining the optical power of the optical signal, the measuring results are modulated by the statistically modifying polarization dependent loss, e.g. at the boundary surface towards the measuring device, thus increasing the (rated) measuring fault. In the above-mentioned example of a tilted termination boundary surface with an angle of 8° and a transition between glass (refractive index of 1.5) and air, the measuring fault will be approximately 0.5% or 0.022 dB (peak to peak).

SUMMARY OF THE INVENTION

It is an object of the present invention to reduce the influence of return loss (RL) and polarization dependent loss (PDL) on boundary surfaces in an optical path for measuring purposes. The object is solved by the independent claim. Preferred embodiments are shown by the dependent claims.

According to the invention, a boundary surface (between optical media with different refractive indices) of a measuring device is provided to be angular in order to reduce back reflection of an optical signal at that boundary surface into the direction of the source of the optical signal.

The boundary surface according to the invention further provides a transmission (through the boundary surface) independent of the state of polarization of the incident optical signal. This can be achieved in that the transmissions of the optical signal perpendicular and parallel to the plane of incidence of the angular boundary surface are substantially equal. The plane of incidence is generally defined by the incident signal beam and the normal (or plumb line) to the boundary surface. Thus, the boundary surface provides an interface between optical media with different refractive indices, whereby polarization dependent effects at the boundary surface can be reduced or even be avoided since the transmission through the boundary surface becomes independent of the state of polarization of the incident optical signal. This substantial independence of the state of polarization of the incident optical signal, however, generally leads to a substantially constant loss or the optical signal at the boundary surface, which is independent of the state of polarization.

The invention thus, on one hand, leads to a reduction of the return reflections towards the incident optical signal and, on the other hand, leads to a substantially constant loss substantially independent of the state of polarization of the incident optical signal.

For avoiding or reducing the polarization dependent loss (PDL) the angular boundary surface (e.g. a termination facet) will be preferably provided with a specific coating substantially fulfilling the condition:

$$Ts=Tp$$

whereby Ts is the transmission perpendicular to the plane of incidence of the boundary surface, and Tp is the transmission parallel to the plane of incidence of the boundary surface. For physical reasons, the transmission rates of the optical signal perpendicular and parallel to the plane of incidence of the angular boundary surface will generally be smaller than 100%.

In case that Ts=Tp, there is no polarization dependent loss at the boundary surface even though the boundary surface is angular.

A coating of the boundary surface is preferably provided to achieve a polarization independent transmission and also to reduce reflection at the boundary surface.

In the ideal case, the boundary surface should provide a smooth and continuous gradient between the refractive indices. This, however, encounters the problem of technical feasibility. Instead of such a continuous gradient between the refractive indices, a plurality of individual layers can be provided e.g. by evaporating or sputtering processes. It is to be understood that a plurality of individual layers also provides more degrees of freedom for the optical design. For technical or cost reasons it might be necessary to limit the number of materials applied for the individual layers. In such a case, it has been found that a sequence of alternating layers of only two different materials already exhibited remarkable results.

General properties of applicable materials for the polarization independent boundary surface are that the material can be applied as preferably thin layers and the material preferably provides dielectric, loss-free layers. Suitable materials have been found in the following list of common evaporating materials:

hafnium oxide $HfO_2$ titanium oxide $TiO_2$ aluminum oxide $Al_2O_3$ zirconium oxide $ZrO_2$ silicon oxide $SiO_2$ When designing the plurality of individual layers, in particular the interference properties of the layers, alone and in combination with each other, have to be taken into account preferably in order to reduce back reflected light as much as possible.

The polarization independent coating of the boundary surface is preferably provided to be also dereflective or anti-reflective, thus further reducing return reflections. By carefully selecting coating parameters, such as number of coating layers, coating materials and/or layer thickness of the return reflection reducing coating, the above given condition Ts=Tp can also be fulfilled for coatings wherein the average transmission is smaller than 100%, or, in other words, for coatings which provide the condition:

$$\frac{Ts + Tp}{2} < 100\%.$$

That means that even 'non-perfect' dereflective coatings according to the invention with reflectivity values of R>0 do not provide polarization dependent transmission losses and can thus be applied.

In case that the values of the perpendicular and parallel transmission Ts and Tp (respectively) exhibit dependencies on the wavelengths of the incident optical signal, a certain tradeoff or compromise for different wavelengths or one or more wavelength bands might have to be made in order to reduce the polarization dependent loss for those wavelengths or wavelength bands. In such a case, the condition Ts=Tp will hardly be fulfilable for all wavelengths so that a certain compromise has to be made and a certain wavelength dependent polarization dependent loss will have to be encountered. However, by carefully balancing $Ts(\lambda)$ and $Tp(\lambda)$ the affect of polarization dependent loss can be efficiently minimized for certain wavelengths or wavelength bands of interest.

The invention is preferably used for providing a defined termination (facet) of an optical path, in particular of an optical fiber path but can be employed for any kind of boundary or contact surface. Such defined terminations of optical paths are in particular useful for measurement purposes since the measurement fault, and thus the measurement resolution, can be significantly improved by eliminating or at least reducing polarization dependent effects.

The invention can be applied e.g. for termination surfaces, termination adapters, detector surfaces, or the like.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
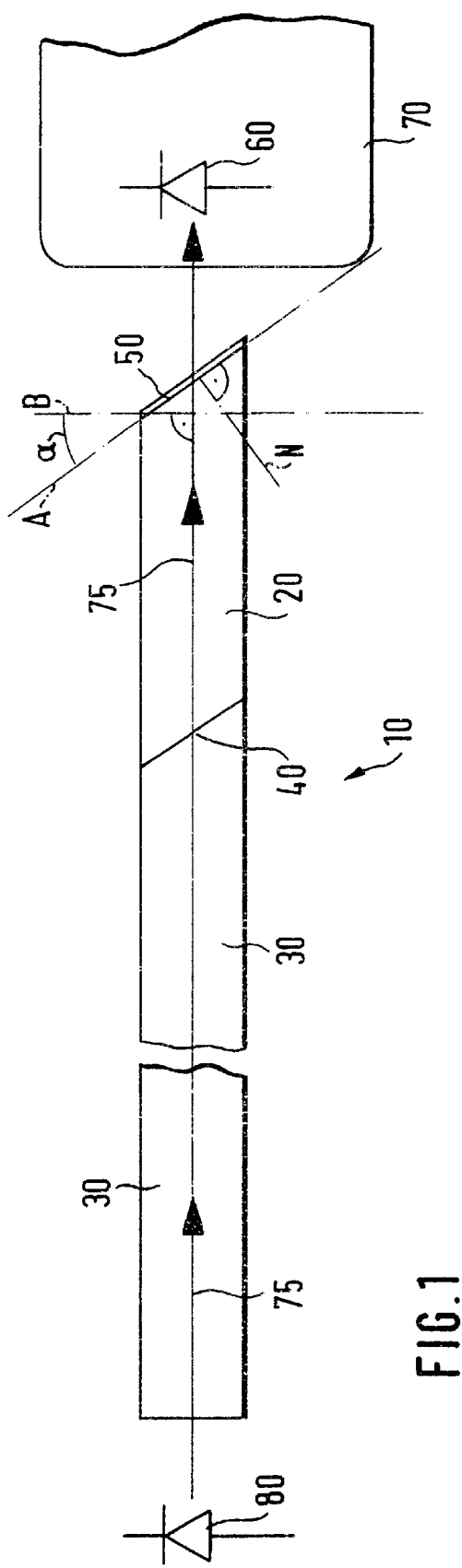
FIG. 1 illustrates a schematic diagram of a termination adapter 10 according to the invention.

FIG. 1 illustrates a schematic diagram of a termination adapter 10 according to the invention. The termination adapter 10 comprises a fiber segment 20, which is spliced to or otherwise coupled to a fiber 30. A boundary 40 between the fiber 30 and the fiber segment 20 is provided in a way that substantially no polarization loss dependency occurs, so that the boundary 40 substantially does not provide an optical boundary surface or, in other words, the fiber segment can be regarded as being part of the optical fiber 30. This can be achieved, as well-known in the art, e.g. by melting the fibers together or by providing a (glass/glass) contact without air transition.

A boundary surface 50 is provided at the very end of the termination adapter 10 towards e.g. an optical detector 60 of an optical measuring device 70. The optical detector 60 is adapted to receive and measure an optical signal 75 which might have been coupled into the optical fiber 30 by an optical source 80 which might be located at the opposite site of the fiber 30.

A plane A of the boundary surface 50 is angular or tilted by an angle 'Y with respect to a plane B of the incident optical signal 75. Thus, a return reflection at the boundary surface 50 towards the fiber 30, and accordingly towards the optical source 80, can be reduced or avoided. The plane of incidence is defined here by the vector of the incident signal beam 75 and the normal N to the plane A of the boundary surface 50. In the representation of FIG. 1, the plane of incidence corresponds with the plane of drawing.

The boundary surface 50 is coated with one or more layers of optically different materials in order to provide a good matching between the transmission Ts($\lambda$) perpendicular to the plane B and the transmission Tp($\lambda$) parallel to the plane B at the boundary surface 50, so that $$Ts(\lambda; \lambda 1 \ldots \lambda 2) = Tp(\lambda; \lambda 1 \ldots \lambda 2)$$

or, in other words, that the perpendicular and parallel transmission Ts($\lambda$) and Tp($\lambda$) are substantially equal within a wavelength band between $\lambda 1$ and $\lambda 2$.

Figure 2A:
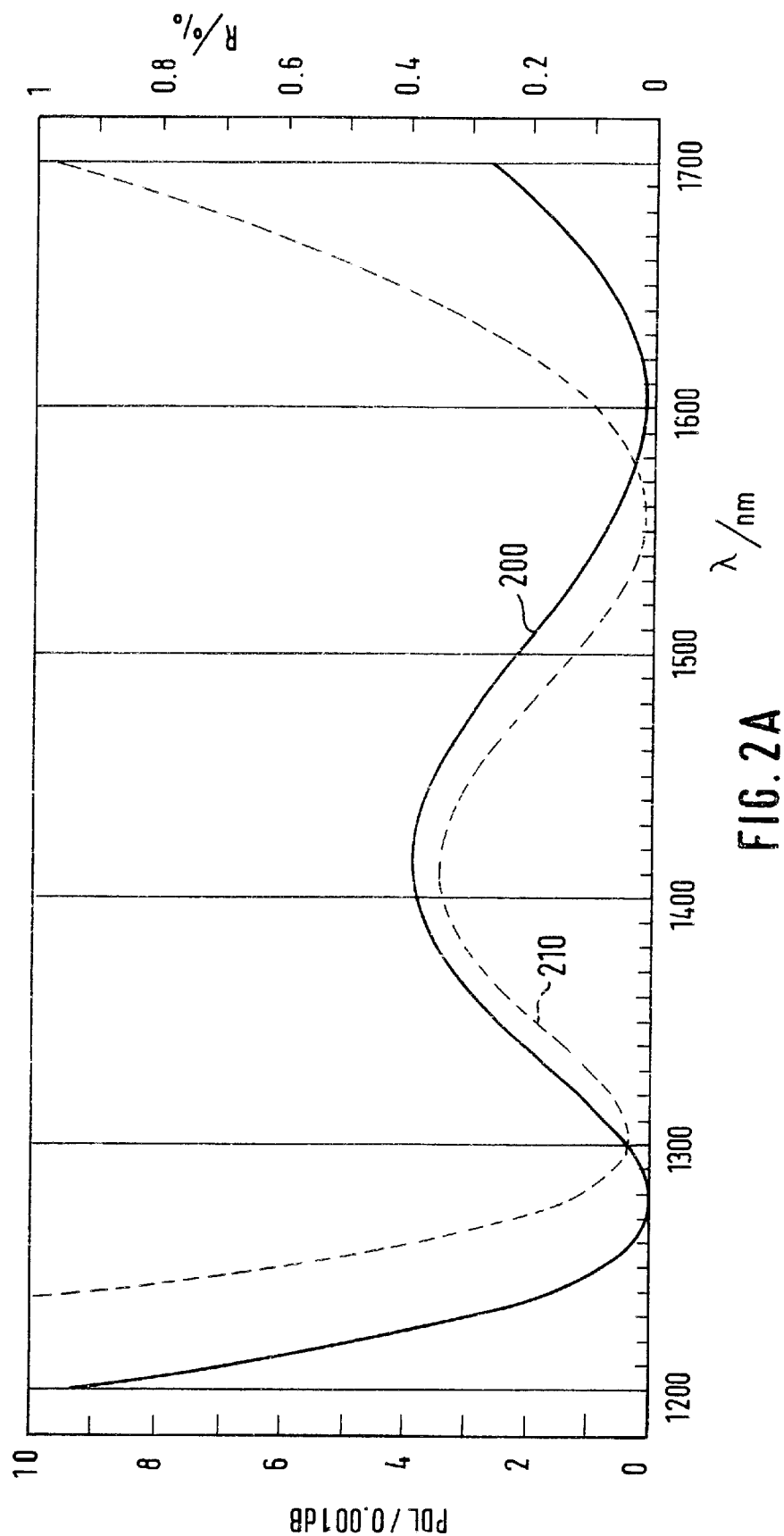
FIGS. 2A and 2B depict measured characteristics of reflection, polarization dependent loss (PDL), and transmission for the boundary surface 50 of FIG. 1, and FIGS. 3A and 3B illustrate other applications according to the invention.
Figure 2B:
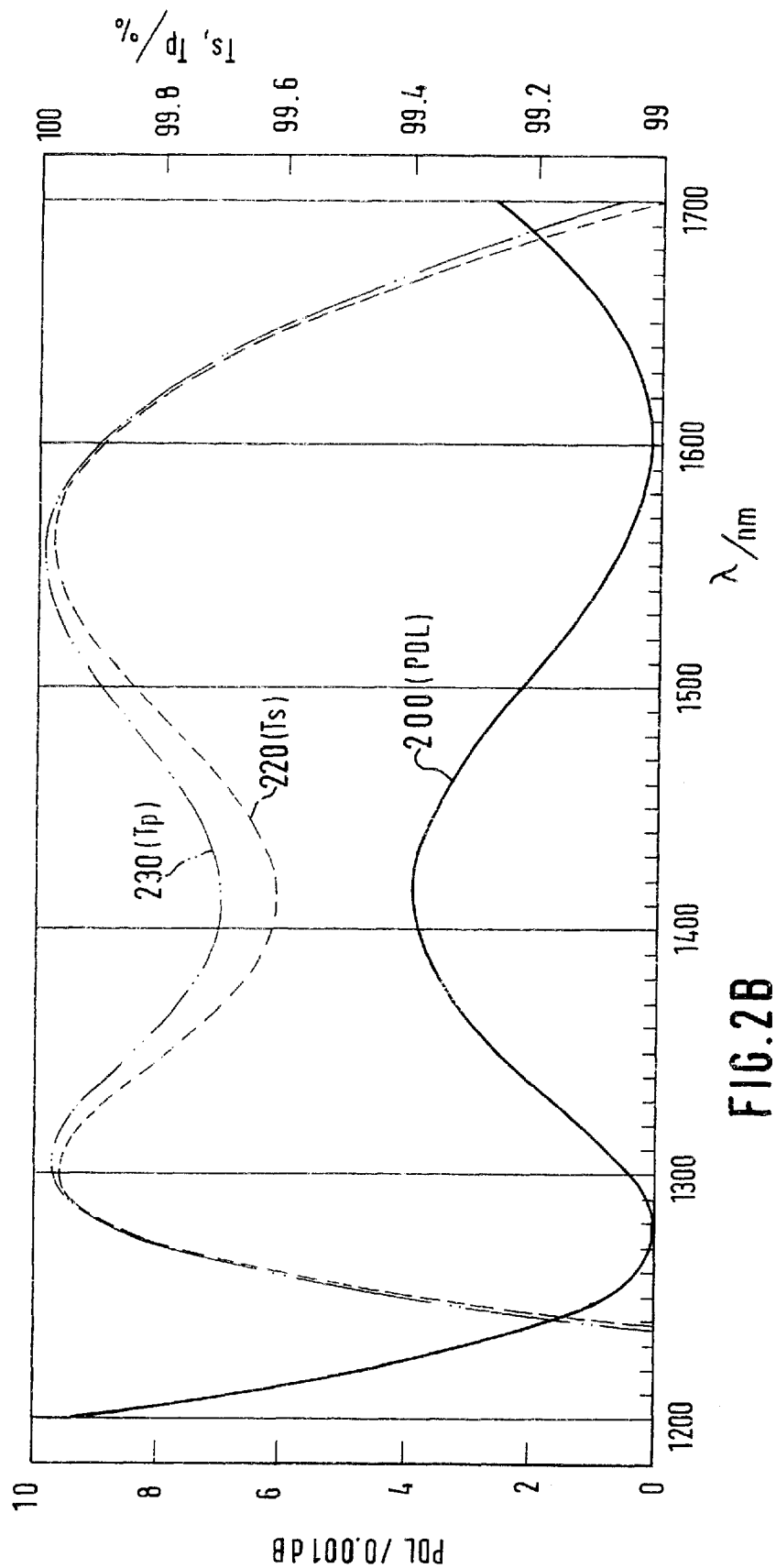

A specific example of a boundary surface 50 in accordance with the invention shall now be given, and the effect thereof will be illustrated by means of measuring plots as shown in FIGS. 2A and 2B. The exemplary boundary surface 50 between silica glass and air comprises the following layers:

| Layer # | Layer thickness | Layer material | Refractive index |
|---|---|---|---|
|  |  | silica glass | 1.45 |
| 1 | 71.959 | $TiO_2$ | 2.153421 |
| 2 | 86.590 | $SiO_2$ | 1.444266 |
| 3 | 185.813 | $TiO_2$ | 2.153421 |
| 4 | 47.256 | $SiO_2$ | 1.444266 |
| 5 | 117.581 | $TiO_2$ | 2.153421 |
| 6 | 47.299 | $SiO_2$ | 1.444266 |
| 7 | 78.062 | $TiO_2$ | 2.153421 |
| 8 | 280.718 | $SiO_2$ | 1.444266 |
|  |  | air | 1.00 |

FIGS. 2A and 2B depict measured characteristics of reflection, polarization dependent loss (PDL), and transmission for the above boundary surface 50 example. The boundary surface 50 is tilted by an angle 'Y=8°. In both FIGS. 2A and 2B, the wavelength $\lambda$ is depicted on the x-axis in nm ($10^{-9}$ m), and the values for a measured PDL curve are shown left-hand side on the y-axis in 0.001 dB. FIG. 2A additionally depicts on the right hand side of the y-axis the values of a measured reflection R curve 210 in %. FIG. 2B additionally depicts on the right hand side of the y-axis the values as well of a measured transmission Ts curve 220 as of a measured transmission Tp curve 230, both in %.

As apparent from FIGS. 2A and 2B, PDL can be reduced in the wavelength band of about 1270 nm to 1600 nm to maximum PDL values of 0.0039 dB. Accordingly, the minimum values of transmission Ts and Tp (cf. FIG. 2B) in that wavelength band do not go below 99.6%. The values of reflection R (cf. FIG. 2A) in that wavelength band do not go beyond 0.34%.

'Almost zero PDL regions' with PDL values smaller than 0.0005 dB are located in the wavelength bands of about 1255–1300 nm and 1565–1635 nm. As can be seen from FIG. 2B, those 'almost zero PDL regions' do not coincide with the maxima of the transmission values for Ts and Tp. 'Almost zero reflection regions' with reflection values smaller than 0.1% are located in the wavelength bands of about 1280–1330 nm and 1510–1600 nm. In particular in the regions of intersection between PDL and R, a good compromise between low PDL and low reflection can be found.

Using different coating materials and different sequences of coating layers allows locating and shifting the 'almost zero PDL regions' and the 'almost zero reflection regions' in accordance with the required wavelengths and applications.

FIG. 3A illustrates another application according to the invention. The fiber 30 is coupled to the optical source 80 (not shown in FIG. 3) providing the optical signal 75. The fiber 30 provides a termination surface 300 directed towards a coupling member 310 of the optical measuring device 70. The optical signal 75 leaves the termination surface 300 and is coupled via a lens system 320 of the coupling member 310 into a multi-mode fiber 330 which, again, emits the optical signal 75 to the optical detector 60, preferably a PIN-diode.

A termination surface 340 of the of the multi-mode fiber 330 directed towards the optical detector 60 is provided in accordance with the present invention, i.e. angular with respect to the plane B perpendicular to the incident optical signal 75 and provided with an interface between the refractive indices of the multi-mode fiber 330 and air, whereby the transmission of the incident optical signal 75 through the termination surface 50 is substantially independent of the state of polarization of the incident optical signal 75. Additionally, the termination surface 300 of the fiber 30 and/or the other termination surface 350 of the multi-mode fiber 330 might also be provided in accordance with the invention.

FIG. 3B depicts an alternative embodiment of the arrangement of the optical detector 60 and the boundary surface 50. Whereas PDL and return loss at the transition between the optical detector 60 and the boundary surface 50 are minimized in the embodiment of FIG. 3A by providing the boundary surface 50 angular and with polarization independent transmission, the embodiment of FIG. 3B inverts that arrangement in that a termination surface 360 of the optical detector 60 is provided angular and with polarization independent transmission. Thus, the same effect of minimized PDL and return loss can be achieved. Further improvements can be attained by also providing the boundary surface 340 and/or other boundary surfaces in the optical system in accordance with the invention.

Referring again to FIGS. 3A and 3B, in a more generalized view it can be said that any boundary surface can be provided in accordance with the present invention by providing an interface between the refractive indices of the adjoining media which is angular with respect to the plane B perpendicular to the incident optical signal 75.

What is claimed is:

1. An optical measuring device comprising an optical fiber, and
    an optical detector adapted to receive and measure an incident optical signal from the optical fiber, wherein:
    at least one of the optical fiber and the optical detector comprises an interface between optical media with different refractive indices, the interface is arranged angular with respect to the incident optical signal for reducing a return reflection in the direction of the incident optical signal,
    the transmission of light with a polarization perpendicular to the plane of incidence of the optical signal substantially equals the transmission of light with a polarization parallel to the plane of incidence of the optical signal, so that the transmission of the incident optical signal through the interface is substantially independent of the state of polarization of the incident optical signal,
    the transmissions of light with a polarization perpendicular and parallel to the plane of incidence of the optical signal being substantially balanced for a plurality of different wave lengths or for one or more wave length bands.

2. The optical measuring device of claim 1, wherein the interface provides a gradient in refractive indices between the refractive indices of the optical media.

3. The optical measuring device of claim 1, wherein the interface comprises a plurality of individual layers.

4. The optical measuring device of claim 3, wherein the plurality of individual layers comprise one or more materials of hafnium oxide $HfO_2$, titanium oxide $TiO_2$, aluminum oxide $Al_2O_3$, zirconium oxide $ZrO_2$, or silicon oxide $SiO_2$.

5. The optical measuring device according to claim 1, wherein the interface is provided as a termination of the optical path of the optical fiber.

6. The optical measuring device according to claim 1, wherein the interface is provided as a termination adapter for terminating the optical path of the optical fiber.

7. The optical measuring device according to claim 1, wherein the interface is provided by the optical detector.

8. The optical measuring device of claim 1 wherein the interface includes a boundary surface.

9. The optical measuring device of claim 1 wherein the interface includes a boundary face.

10. The optical measuring device of claim 1 wherein the interface includes a boundary facet.

11. The optical measuring device of claim 3 wherein the plural individual layers include a sequence of alternating layers of different materials.

12. An optical fiber measuring device comprising an optical fiber, and
an optical fiber detector adapted to receive and measure an incident optical signal from the optical fiber, wherein:
at least one of the optical fiber and the optical detector comprises an interface between optical media with different refractive indices, the interface is arranged angular with respect to the incident optical signal for reducing a return reflection in the direction of the incident optical signal,
the transmission of light perpendicular to the plane of incidence of the optical signal substantially equals the transmission of light with a polarization parallel to the plane of incidence of the optical signal, so that the transmission of the optical signal through the interface is substantially independent of the state of polarization of the incident optical signal,
the transmission of light with a polarization perpendicular and parallel to the plane of incidence of the optical signal being substantially balanced for a plurality of different wavelengths or for one or more wavelength bands.

* * * * *